United States Patent
Odani et al.

(10) Patent No.: US 10,640,603 B2
(45) Date of Patent: May 5, 2020

(54) URETHANE (METH)ACRYLATE RESIN, CURABLE RESIN COMPOSITION, CURED PRODUCT THEREOF, AND PLASTIC LENS

(71) Applicant: DIC Corporation, Tokyo (JP)

(72) Inventors: Yasuko Odani, Ichihara (JP); Nobuo Kobayashi, Ichihara (JP)

(73) Assignee: DIC Corporation, Tokyo (JP)

(*) Notice: Subject to any disclaimer, the term of this patent is extended or adjusted under 35 U.S.C. 154(b) by 175 days.

(21) Appl. No.: 15/549,444

(22) PCT Filed: Jan. 21, 2016

(86) PCT No.: PCT/JP2016/051681
§ 371 (c)(1),
(2) Date: Aug. 8, 2017

(87) PCT Pub. No.: WO2016/129350
PCT Pub. Date: Aug. 18, 2016

(65) Prior Publication Data
US 2018/0030198 A1   Feb. 1, 2018

(30) Foreign Application Priority Data
Feb. 12, 2015 (JP) ................................. 2015-025267

(51) Int. Cl.
| | | |
|---|---|---|
| *C08G 18/48* | (2006.01) | |
| *G02B 1/04* | (2006.01) | |
| *C08F 299/06* | (2006.01) | |
| *C08L 75/16* | (2006.01) | |
| *C08G 18/24* | (2006.01) | |
| *C08G 18/10* | (2006.01) | |
| *C08G 18/76* | (2006.01) | |
| *C08G 18/32* | (2006.01) | |
| *C09D 175/16* | (2006.01) | |
| *C08G 18/67* | (2006.01) | |
| *C08F 290/06* | (2006.01) | |
| *C08G 18/66* | (2006.01) | |

(52) U.S. Cl.
CPC ...... *C08G 18/4833* (2013.01); *C08F 290/067* (2013.01); *C08F 299/065* (2013.01); *C08G 18/10* (2013.01); *C08G 18/242* (2013.01); *C08G 18/3215* (2013.01); *C08G 18/4879* (2013.01); *C08G 18/6666* (2013.01); *C08G 18/67* (2013.01); *C08G 18/672* (2013.01); *C08G 18/7607* (2013.01); *C08G 18/7621* (2013.01); *C08G 18/7671* (2013.01); *C08L 75/16* (2013.01); *C09D 175/16* (2013.01); *G02B 1/04* (2013.01); *G02B 1/041* (2013.01)

(58) Field of Classification Search
CPC ............ C08G 18/4833; C08G 18/7671; C08G 18/6666; C08G 18/7621; C08G 18/672; C08G 18/67; C08G 18/3215; C08G 18/4879; C08G 18/7607; C08G 18/10; C08G 18/242; C08F 299/065; C08F 290/067; G02B 1/041; G02B 1/04; C09D 175/16; C08L 75/16
See application file for complete search history.

(56) References Cited

FOREIGN PATENT DOCUMENTS

| JP | 10-324726 A | | 12/1998 |
|---|---|---|---|
| JP | 2010-31163 A | * | 2/2010 |
| JP | 2012-047922 A | | 3/2012 |

OTHER PUBLICATIONS

International Search Report dated Apr. 19, 2016, issued for PCT/JP2016/051681.

* cited by examiner

*Primary Examiner* — Rabon A Sergent
(74) *Attorney, Agent, or Firm* — Locke Lord LLP; James E. Armstrong, IV; Nicholas J. DiCeglie, Jr.

(57) ABSTRACT

A urethane (meth)acrylate resin wherein the viscosity of the resin is low, the formability into a sheet-formed product, in particular, an optical sheet provided with fine uneven shapes on the surface is excellent, and a high refractive index can be realized, a curable resin composition including the urethane (meth)acrylate resin as an indispensable component, a cured product thereof, and a plastic lens are provided. A urethane (meth)acrylate resin produced by reacting aromatic diisocyanate compound (a), bisphenol-ethylene oxide adduct diol (b) having at least three aromatic ring or alicyclic structures in the molecule, and hydroxy-containing (meth)acrylate compound (c), which are indispensable raw material components, a curable resin composition containing the urethane (meth)acrylate resin as a primary component, and a cured product thereof.

9 Claims, No Drawings

URETHANE (METH)ACRYLATE RESIN, CURABLE RESIN COMPOSITION, CURED PRODUCT THEREOF, AND PLASTIC LENS

TECHNICAL FIELD

The present invention relates to a curable resin composition suitable for, for example, a Fresnel lens sheet and a lenticular sheet used for projection screens, e.g., a projection television, a prism sheet and a microlens sheet used as a backlight of a liquid crystal display device and the like, and a moth-eye film used as an antireflection film of a flat-screen television, a low-viscosity high-refractive-index urethane (meth)acrylate suitable for a primary component of the curable resin composition, and a cured product thereof.

BACKGROUND ART

In recent years, regarding displays of liquid crystal display devices and the like, optical sheets that are provided with fine uneven shapes on the surfaces and that realize predetermined functions by refracting light with the uneven structures have been indispensable and the performance, e.g., a high refractive index or a shape maintaining force, is required. Examples of such optical sheets include a Fresnel lens sheet and a lenticular sheet used as projection screens, e.g., a projection television, a prism sheet and a microlens sheet used for a backlight of a liquid crystal display device and the like, and a moth-eye film used as an antireflection film of a flat-screen television in recent years.

For example, a resin material for forming a prism sheet (optical sheet) used for a backlight of a liquid crystal display device or the like is required to have, in combination, the performance and the characteristics such as being a liquid, being a solventless material which does not require a time for drying a solvent in a production process, having low viscosity suitable for application in spite of being a solventless material, and having high brightness, that is, a high refractive index for a resin, in order to maintain luminosity with a smaller amount of light.

A technology to produce an optical sheet by using such a material that has a high refractive index and includes, for example, urethane acrylate, which is obtained by reacting bisphenol F diethoxy glycol, tolylene diisocyanate, and 2-hydroxyethyl acrylate and which has high aromaticity, as a primary component in the molecular structure is known (for example, refer to PTL 1).

The optical sheet described in PTL 1 has high aromaticity of the resin material, and a refractive index of about 1.55 can be realized. However, under the present circumstances, a high refractivity, which is particularly required in recent years and which is required for increasing the brightness of the lens sheet, is not satisfied. Consequently, in the case where an isocyanate compound, for example, diphenylmethane diisocyanate, having higher aromaticity is used for the purpose of realizing a higher refractive index, the resin material itself becomes highly viscous or is crystallized, and forming into an optical member becomes difficult.

Meanwhile, it is proposed to produce a low-viscosity high-refractive-index cured product by using a urethane (meth)acrylate having an open circular structure of lactone, a bisphenol structure, and at least two radical-polymerizable unsaturated groups in the molecule (for example, refer to PTL 2).

The bisphenol structures described in PTL 2 are bisphenol A, bisphenol F, and bisphenol S and the refractive indices thereof are still about 1.55. In the case where a sulfur atom is further included, a urethane (meth)acrylate produced by using this may be colored in itself, or a light resistance problem may occur when a lens is formed. Therefore, application to such use is difficult.

CITATION LIST

Patent Literature

PTL 1: Japanese Unexamined Patent Application Publication No. 10-324726
PTL 2: Japanese Unexamined Patent Application Publication No. 2012-047922

SUMMARY OF INVENTION

Technical Problem

Accordingly, an issue to be addressed by the present invention is the provision of a urethane (meth)acrylate resin wherein the viscosity of the resin is low, the formability into a sheet-formed product, in particular, an optical sheet provided with fine uneven shapes on the surface is excellent, and a high refractive index can be realized, a curable resin composition including the urethane (meth)acrylate resin as an indispensable component, a cured product thereof, and a plastic lens.

Solution to Problem

In order to address the above-described issue, the present inventors performed intensive investigations. As a result, it was found that a urethane (meth)acrylate resin, which was produced by using a diol having a specific aromatic ring or alicyclic structure and combining this with an aromatic diisocyanate, had low viscosity and a very high refractive index, and the present invention was realized.

That is, the present invention provides a urethane (meth)acrylate resin produced by reacting aromatic diisocyanate compound (a), bisphenol-ethylene oxide adduct diol (b) having at least three aromatic ring or alicyclic structures in the molecule, and hydroxy-containing (meth)acrylate compound (c), which are indispensable raw material components, a curable resin composition including the urethane (meth)acrylate resin as an indispensable component, and a cured product thereof.

Advantageous Effects of Invention

According to the present invention, a urethane (meth)acrylate resin wherein the viscosity of the resin itself is low, the formability into a sheet-formed product, in particular, an optical sheet provided with fine uneven shapes on the surface is excellent, and a high refractive index can be realized, a curable resin composition including the urethane (meth)acrylate resin, a cured product thereof, and a plastic lens can be provided.

DESCRIPTION OF EMBODIMENTS

A urethane (meth)acrylate resin according to the present invention is a urethane (meth)acrylate resin produced by reacting aromatic diisocyanate compound (a), bisphenol-ethylene oxide adduct diol (b) having at least three aromatic ring or alicyclic structures in the molecule, and hydroxy-containing (meth)acrylate compound (c), which are indispensable raw material components.

High refractivity can be realized by using aromatic diisocyanate compound (a) and bisphenol-ethylene oxide adduct diol (b) having at least three aromatic ring or alicyclic structures in the molecule in combination, and reduction in the viscosity is intended by adopting a urethane (meth) acrylate structure.

There is no particular limitation regarding aromatic diisocyanate compound (a), and examples include 1,5-naphthylene diisocyanate, 4,4'-diphenylmethane diisocyanate, 4,4'-diphenyldimethylmethane diisocyanate, 4,4'-dibenzyl diisocyanate, dialkyldiphenylmethane diisocyanate, tetraalkyldiphenylmethane diisocyanate, 1,3-phenylene diisocyanate, 1,4-phenylene diisocyanate, tolylene diisocyanate, xylylene diisocyanate, and tetramethylxylylene diisocyanate. These may be used alone or in combination.

Among the above-described compounds, because the resulting urethane (meth)acrylate resin has low viscosity, reduced crystallinity, and excellent formability, those having structural site (a-1) denoted by structural formula (1) described below

[Chem. 1]

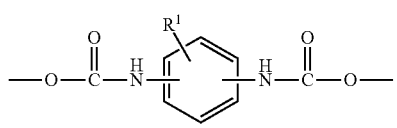

(1)

(in the formula, $R^1$ represents a hydrogen atom or a methyl group) and
structural site (a-2) denoted by structural formula (2) described below

[Chem. 2]

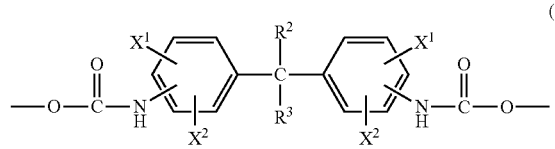

(2)

(in the formula, each of $R^2$, $R^3$, $X^1$, and $X^2$ represents a hydrogen atom or a methyl group)
as urethane structural sites resulting from aromatic diisocyanate compound (a), which is a raw material for the urethane (meth)acrylate resin, are preferable. In particular, preferably, the structural sites are included, in combination, such that the molar ratio [(a-1)/(a-2)] in the resin is 45/55 to 60/40.

Structural site (a-1) and structural site (a-2) are urethane structural sites resulting from aromatic diisocyanate compound (a) used as the raw material, and $R^1$ in structural formula (1) denoting structural site (a-1) represents a hydrogen atom or a methyl group. Specific examples of aromatic diisocyanate compound (a) include 1,3-phenylene diisocyanate, 1,4-phenylene diisocyanate, 2,4-tolylene diisocyanate, and 2,6-tolylene diisocyanate. Among these, 2,4-tolylene diisocyanate and 2,6-tolylene diisocyanate are preferable because an effect of reducing the viscosity is considerable while particularly high aromaticity is maintained.

In structural formula (2) denoting structural site (a-2), each of $R^2$ and $R^3$ represents a hydrogen atom or a methyl group and each of $X^1$ and $X^2$ represents a hydrogen atom or a methyl group. Specific examples of aromatic diisocyanate compound (a) that is a raw material corresponding to structural site (a-2) include 4,4'-diphenylmethane diisocyanate, 2,2'-bis(paraphenyl isocyanate)propane, and 3,3'-dimethyl-4,4'-diphenylmethane diisocyanate. In particular, 4,4'-diphenylmethane diisocyanate or 3,3'-dimethyl-4,4'-diphenylmethane diisocyanate is preferable because an effect of suppressing crystallization of the resulting urethane (meth)acrylate is good.

As described above, urethane (meth)acrylate resin (A) according to the present invention is produced by reacting aromatic diisocyanate compound (a), bisphenol-ethylene oxide adduct diol (b) having at least three aromatic ring or alicyclic structures in the molecule, and hydroxy-containing (meth)acrylate compound (c), which are indispensable raw material components, and bisphenol-ethylene oxide adduct diol (b) having at least three aromatic ring or alicyclic structures in the molecule has a plurality of aromatic ring or alicyclic structures in the molecular structure thereof. Therefore, the refractive index of the resulting cured product is very high.

Specific examples of bisphenol-ethylene oxide adduct diol (b) having at least three aromatic ring or alicyclic structures in the molecule include ethylene oxide adduct diols of bisphenol AP, bisphenol BP, bisphenol M, bisphenol P, bisphenol PH, bisphenol TMC, and bisphenol Z. In particular, an ethylene oxide adduct diol of bisphenol AP, bisphenol M, bisphenol P, bisphenol PH, or bisphenol Z is preferably used because the symmetry of the molecular structure is low and the crystallinity of the resulting urethane (meth)acrylate resin can be suppressed. It is particularly preferable to use an ethylene oxide adduct diol of bisphenol AP or bisphenol Z.

Meanwhile, other aromatic diols may be used in combination within the bounds of not impairing the effect of the present invention. Examples of such aromatic diols include aromatic polyols, e.g., hydroquinone, catechol, 1,4-benzene dimethanol, 3,3'-biphenyl diol, 4,4'-biphenyl diol, biphenyl-3,3'-dimethanol, biphenyl-4,4'-dimethanol, bisphenol A, bisphenol B, bisphenol F, bisphenol S, 1,4-dihydroxynaphthalene, 1,6-dihydroxynaphthalene, 2,7-naphthalene diol, binaphthol, bis(2,7-dihydroxynaphthyl)methane, and 4,4', 4''-methylidynetrisphenol;

polyether-modified aromatic polyols produced by ring-opening polymerization between the above-described aromatic polyols and various cyclic ether compounds, e.g., ethylene oxide, propylene oxide, tetrahydrofuran, ethyl glycidyl ether, propyl glycidyl ether, butyl glycidyl ether, phenyl glycidyl ether, and allyl glycidyl ether;

lactone-modified aromatic polyols produced by polycondensation between the above-described aromatic polyols and cyclic ester compounds described later;

aromatic ring-containing polyester polyols produced by reacting an aliphatic dicarboxylic acids, e.g., malonic acid, succinic acid, glutaric acid, adipic acid, and pimelic acid with the above-described aromatic polyols;

and aromatic ring-containing polyester polyols produced by reacting an aromatic dicarboxylic acids, e.g., phthalic acid, phthalic anhydride, terephthalic acid, isophthalic acid, and orthophthalic acid, or anhydrides thereof with the above-described aromatic polyols.

These may be used alone or at least two types may be used in combination. In particular, it is preferable to use, in combination, the bisphenol compounds and polyether-modified bisphenol compounds produced by ring-opening polymerization between the bisphenol compounds and various cyclic ether compounds.

Examples of hydroxy-containing (meth)acrylate compound (c) used in the present invention include aliphatic (meth)acrylate compounds, e.g., 2-hydroxyethyl (meth)acrylate, 2-hydroxypropyl (meth)acrylate, 4-hydroxybutyl (meth)acrylate, neopentyl glycol mono(meth)acrylate, 4-hydroxyhexyl (meth)acrylate, 1,6-hexane diol mono(meth)acrylate, glycerin di(meth)acrylate, trimethylolpropane di(meth)acrylate, pentaerythritol tri(meth)acrylate, and dipentaerythritol penta(meth)acrylate;

(meth)acrylate compounds, e.g., 4-hydroxyphenyl (meth)acrylate, β-hydroxyphenethyl (meth)acrylate, 4-hydroxyphenethyl (meth)acrylate, 1-phenyl-2-hydroxyethyl (meth)acrylate, 3-hydroxy-4-acetylphenyl (meth)acrylate, and 2-hydroxy-3-phenoxypropyl acrylate, having an aromatic ring in the molecular structure, and others in which a cyclic ester compound is added to the above-described hydroxy-containing acryloyl-containing compound.

Examples of the above-described cyclic ester compound include γ-butyrolactone, γ-valerolactone, δ-valerolactone, ε-caprolactone, ε-methylcaprolactone, ε-ethylcaprolactone, ε-propylcaprolactone, 3-penten-4-olide, 12-dodecanolide, and γ-dodecanolactone.

In this regard, in the case where the compound, in which a cyclic ester compound is added to the hydroxy-containing acryloyl-containing compound, is used, a compound, in which 2 to 4 mol of cyclic ester compound is added to 1 mol of hydroxy-containing acryloyl-containing compound, is preferable because appropriate flexibility is provided and excellent shape recoverability is obtained while the refractive index of a cured product is maintained at a high level.

Among these, 2-hydroxyethyl (meth)acrylate or an ε-caprolactone adduct thereof is preferable particularly from the viewpoint of excellent recoverability in the plastic lens use. In the latter case, a compound in which 2 or 3 mol of ε-caprolactone adduct is added to 1 mol of 2-hydroxyethyl (meth)acrylate is preferable.

Examples of the method for reacting aromatic diisocyanate compound (a), bisphenol-ethylene oxide adduct diol (b) having at least three aromatic ring or alicyclic structures in the molecule, and hydroxy-containing (meth)acrylate compound (c), described above in detail, include a method in which aromatic diisocyanate compound (a) and bisphenol-ethylene oxide adduct diol (b) having at least three aromatic ring or alicyclic structures in the molecule are used such that the molar ratio [(OH)/(NCO)] of the hydroxy group included in bisphenol-ethylene oxide adduct diol (b) having at least three aromatic ring or alicyclic structures in the molecule to the isocyanate group included in aromatic diisocyanate compound (a) becomes within the range of 1/1.5 to 1/2.5 and a reaction is developed at a temperature within the range of 20° C. to 120° C. by using various urethane-forming catalysts as necessary so as to produce an isocyanate-containing intermediate as a reaction product, and subsequently the intermediate and (meth)acrylate compound (c) containing a hydroxy group in the molecular structure are used such that the molar ratio [(OH)/(NCO)] of the hydroxy group included in hydroxy-containing (meth)acrylate compound (c) to the isocyanate group included in the intermediate becomes within the range of 1/0.95 to 1/1.05 and a reaction is developed at a temperature within the range of 20° C. to 120° C. by using various urethane-forming catalysts as necessary.

Other examples of the method for producing urethane (meth)acrylate resin (A) include a method, in which aromatic diisocyanate compound (a), bisphenol-ethylene oxide adduct diol (b) having at least three aromatic ring or alicyclic structures in the molecule, and hydroxy-containing (meth)acrylate compound (c) are prepared in a collective manner and a reaction is developed, and a method, in which aromatic diisocyanate compound (a) is reacted with hydroxy-containing (meth)acrylate compound (c) and, thereafter, bisphenol-ethylene oxide adduct diol (b) having at least three aromatic ring or alicyclic structures in the molecule is reacted.

Regarding the thus produced urethane (meth)acrylate resin (A) according to the present invention, a composition having lower viscosity is obtained, and the viscosity at 25° C. in the state, in which 30 to 50 percent by mass of polymerizable diluent (B) described later is included, is easily made to be within the range of 10 to 1,000 Pa·s.

Among urethane (meth)acrylate resins (A) according to the present invention described above in detail, in particular, urethane (meth)acrylate resins having refractive indices of themselves under the condition of 25° C. of 1.57 or more can be suitable for optical materials because in the case where 2-hydroxyethyl (meth)acrylate is used as hydroxy-containing (meth)acrylate compound (c), the refractive index of 1.60 or more can be easily obtained.

Examples of polymerizable diluent (B) used for the curable resin composition according to the present invention include high-refractive-index monofunctional (meth)acrylate compounds, e.g., phenylbenzyl (meth)acrylate (PBA), phenylthioethyl (meth)acrylate (PTEA), o-phenylphenoxyethyl (meth)acrylate (OPPEA), phenoxybenzyl (meth)acrylate, and naphthylthioethyl (meth)acrylate (NTEA); other monofunctional (meth)acrylates, e.g., n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, benzyl (meth)acrylate, glycidyl (meth)acrylate, morpholine (meth)acrylate, 2-hydroxyethyl (meth)acrylate, 2-hydroxypropyl (meth)acrylate, 4-hydroxybutyl (meth)acrylate, diethylene glycol mono(meth)acrylate, triethylene glycol mono(meth)acrylate, dipropylene glycol mono(meth)acrylate, 2-methoxyethyl (meth)acrylate, methoxydiethylene glycol (meth)acrylate, methoxytriethylene glycol (meth)acrylate, methoxypolyethylene glycol (meth)acrylate, 2-butoxyethyl (meth)acrylate, butoxytriethylene glycol (meth)acrylate, 2-ethoxyethyl (meth)acrylate, 2-(2-ethoxyethoxy)ethyl (meth)acrylate, ethoxypolyethylene glycol (meth)acrylate, 4-nonylphenoxyethylene glycol (meth)acrylate, tetrahydrofurfuryl (meth)acrylate, caprolactone-modified tetrahydrofurfuryl (meth)acrylate, cyclohexyl (meth)acrylate, isobornyl (meth)acrylate, 2-hydroxy-3-phenoxypropyl (meth)acrylate, cyclohexyl (meth)acrylate, cyclohexylmethyl (meth)acrylate, cyclohexylethyl (meth)acrylate, dicyclopentanyl (meth)acrylate, dicyclopentanyloxylethyl (meth)acrylate, dicyclopentenyl (meth)acrylate, dicyclopentenyloxylethyl (meth)acrylate, phenoxyethyl (meth)acrylate, and phenoxydiethylene glycol (meth)acrylate;

difunctional aliphatic (meth)acrylate compounds, e.g., ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butane diol di(meth)acrylate, 1,6-hexane diol di(meth)acrylate, 1,9-nonane diol di(meth)acrylate, neopentyl glycol di(meth)acrylate, dicyclopentanyl di(meth)acrylate, glycerol di(meth)acrylate, neopentyl glycol hydroxypivalic acid ester di(meth)acrylate, caprolactone-modified hydroxypivalic acid neopentyl glycol di(meth)acrylate, hydropivalaldehyde-modified trimethylolpropane di(meth)acrylate, and 1,4-cyclohexanedimethanol di(meth)acrylate;

and trifunctional or higher-functionality aliphatic (meth)acrylate compounds, e.g., trimethylolpropane tri(meth)acrylate, trimethylolpropane-ethylene oxide adduct tri(meth)acrylate, trimethylolpropane-propylene oxide adduct tri(meth)acrylate, pentaerythritol tri(meth)acrylate, glycerol tri(meth)acrylate, alkyl-modified dipentaerythritol tri(meth)acrylate, ditrimethylolpropane tetra(meth)acrylate, ditrimethylolpropane-ethylene oxide adduct tetra(meth)acrylate, ditrimethylolpropane-propylene oxide adduct tetra(meth)acrylate, dipentaerythritol penta(meth)acrylate, and dipentaerythritol hexa(meth)acrylate.

Among these, monofunctional (meth)acrylates are particularly preferable from the viewpoint of reducing the viscosity of the curable resin composition, and phenylbenzyl (meth)acrylate (PBA), phenoxybenzyl (meth)acrylate, or o-phenylphenoxyethyl (meth)acrylate (OPPEA) is particularly preferable because coloring of the compound itself is at a low level and the refractive index is high.

The amount of polymerizable diluent (b) mixed is preferably 10 to 80 percent by mass relative to the synthetic mass in combination with urethane (meth)acrylate resin (A) according to the present invention from the viewpoint of considerable effects of increasing the refractive index and reducing the viscosity. Further, 30 to 90 percent by mass is preferable.

In the present invention, the resin solution in this state can be used as a resin component for a plastic lens. In the case where such a resin component for a plastic lens is made into a paint for forming a plastic lens, it is desirable that the viscosity (25° C.) of the entirety be adjusted to be within the range of 100 mPa·s to 8,000 mPa·s by adding photopolymerization initiator (C) described later and further adding polymerizable diluent (b) as necessary.

Examples of photopolymerization initiator (C) usable here include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 2,2'-dimethoxy-1,2-diphenylethan-1-one, 2,4,6-trimethylbenzoyldiphenylphosphine oxide, bis(2,4,6-trimethylbenzoyl)phenylphosphine oxide, 2-methyl-1-[4-(methylthio)phenyl]-2-morpholino-1-propanone, 2-benzyl-2-dimethylamino-1-(4-morpholinophenyl)-butan-1-one, benzophenone, 4-methylbenzophenone, 4-phenylbenzophenone, 4-(4-methylphenylthio)benzophenone, thioxanthone, 2-isopropylthioxanthone, 4-isopropylthioxanthone, 2,4-dimethylthioxanthone, 2,4-diethylthioxanthone, 2,4-diisopropylthioxanthone, and 2,4-dichlorothioxanthone.

Among these, 4-phenylbenzophenone, 4-(4-methylphenylthio)benzophenone, thioxanthone, 2-isopropylthioxanthone, 4-isopropylthioxanthone, 2,4-diethylthioxanthen-9-one, and the like are particularly preferable from the viewpoint of excellent curability. In particular, benzophenone-based photopolymerization initiators, e.g., 4-phenylbenzophenone and 4-(4-methylphenylthio)benzophenone, having an aromatic nucleus as a substituent are preferable.

In order to sufficiently realize the curability, the amount of photopolymerization initiator (C) mixed is preferably within the range of 0.1 to 25 parts by mass when the total amount of the resins or compounds having a (meth)acryloyl group in the composition is assumed to be 100 parts by mass and, in particular, is more preferably within the range of 2 to 25 parts by mass.

In this regard, in the case where the benzophenone-based photopolymerization initiators, e.g., 4-phenylbenzophenone and 4-(4-methylphenylthio)benzophenone, having an aromatic nucleus as a substituent, are used as photopolymerization initiator (C) in the present invention, it is preferable that a photopolymerization initiator, e.g., 2,4,6-trimethylbenzoyldiphenylphosphine oxide, having photosensitivity in a long wavelength region of 380 nm or more and 600 nm or less be used in combination with the above-described photopolymerization initiators from the viewpoint of good curability. Meanwhile, photopolymerization initiators, e.g., 1-hydroxycyclohexyl phenyl ketone and 2,2'-dimethoxy-1,2-diphenylethan-1-one, having photosensitivity in a short wavelength region of 200 nm or more and 380 nm or less be used from the viewpoint of good curability. In particular, it is preferable that the photopolymerization initiator having photosensitivity in a long wavelength region and the photopolymerization initiator having photosensitivity in a short wavelength region be used in combination from the viewpoint of better curability.

Further, the curable resin composition according to the present invention may include, as some of polymerization components, epoxy (meth)acrylate, di(meth)acrylate having a fluorene skeleton, an acrylate compound having a polyoxyalkylene structure, or the like in addition to urethane (meth)acrylate resin (A) and polymerizable diluent (B) within the bounds of not impairing the effect of the present invention.

In this regard, specifically, epoxy (meth)acrylate is produced by reacting an epoxy resin with (meth)acrylic acid or an anhydride thereof.

Specific examples of such epoxy reins that react with (meth)acrylic acid or an anhydride thereof include diglycidyl ethers of divalent phenols, e.g., hydroquinone and catechol; diglycidyl ethers of biphenol compounds, e.g., 3,3'-biphenyl diol and 4,4'-biphenyl diol; bisphenol epoxy resins, e.g., bisphenol A epoxy resins, bisphenol B epoxy resins, bisphenol F epoxy resins, and bisphenol S epoxy resins; polyglycidyl ethers of naphthol compounds, e.g., 1,4-naphthalene diol, 1,5-naphthalene diol, 1,6-naphthalene diol, 2,6-naphthalene diol, 2,7-naphthalene diol, binaphthol, and bis(2,7-dihydroxynaphthyl)methane; triglycidyl ethers, e.g., 4,4',4"-methylidynetrisphenol; novolac epoxy resins, e.g., phenol novolac epoxy resins and cresol novolac resin;

polyglycidyl ethers of polyether-modified aromatic polyols produced by ring-opening polymerization between the biphenol compounds, bisphenol A, bisphenol B, bisphenol F, bisphenol S, and naphthol compounds and various cyclic ether compounds, e.g., ethylene oxide, propylene oxide, tetrahydrofuran, ethyl glycidyl ether, propyl glycidyl ether, butyl glycidyl ether, phenyl glycidyl ether, and allyl glycidyl ether;

and polyglycidyl ethers of lactone-modified aromatic polyols produced by polycondensation between the biphenol compounds, bisphenol A, bisphenol B, bisphenol F, bisphenol S, and naphthol compounds and lactone compounds, e.g., ε-caprolactone.

In particular, those having an aromatic ring skeleton in the molecular structure are preferable because the refractive indices of finally produced cured products increase. Most of all, polyglycidyl ethers of the bisphenol epoxy resins and the naphthol compounds, in particular, the bisphenol epoxy resins are more preferable because the resulting cured coating films have higher refractive indices and have high adhesion to plastic film base materials even under high-temperature high-humidity conditions.

Also, the bisphenol epoxy resins having an epoxy equivalent within the range of 160 to 1,000 g/eq are preferable and those having an epoxy equivalent within the range of 165 to 600 g/eq are more preferable because cured products having higher refractive indices and higher hardnesses are produced.

Meanwhile, the (meth)acrylic acid or an anhydride thereof that reacts with the epoxy resin is more preferably acrylic acid because, in particular, a curable resin composition having excellent curability is produced.

Specifically, the di(meth)acrylate having a fluorene skeleton is a compound denoted by structural formula (2) described below.

[Chem. 3]

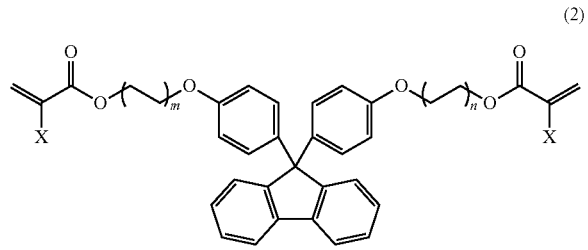

(2)

(in the formula, X represents a hydrogen atom or a methyl group, and each of m and n is an integer of 0 to 5)

Meanwhile, the acrylate compound having a polyoxyalkylene structure is a compound that has a polyoxyalkylene structure, e.g., a polyethylene glycol chain or a polypropylene glycol chain, in the molecular structure. Examples include a diacrylate of polyethylene glycol having a number of ethylene oxide units of 4 to 15, a monoacrylate of polyethylene glycol having a number of ethylene oxide units of 4 to 15, a diacrylate of polypropylene glycol having a number of propylene oxide units of 4 to 15, a monoacrylate of propylene glycol having a number of propylene oxide units of 4 to 15, an ethylene-oxide-modified glycerol triacrylate (number of EO units of 3 to 10), a propylene-oxide-modified glycerol triacrylate (number of PO units of 3 to 10), an ethylene-oxide-modified trimethylolpropane triacrylate (number of EO units of 4 to 20), a propylene-oxide-modified trimethylolpropane triacrylate (number of PO units of 4 to 20), a diacrylate of bisphenol-ethylene oxide adduct having a number of ethylene oxide units of 4 to 15, and a diacrylate of bisphenol-propylene oxide adduct having a number of propylene oxide units of 4 to 15.

In this case, the proportion of epoxy (meth)acrylate, di(meth)acrylate having a fluorene skeleton, or acrylate compound having a polyoxyalkylene structure mixed is preferably 40 to 60 percent by mass in the polymerization components.

Also, it is preferable that the above-described high-refractive-index monofunctional (meth)acrylate compound be mixed into the epoxy (meth)acrylate or the urethane (meth) acrylate because the resulting cured product has a higher refractive index.

The curable resin composition according to the present invention may include various photosensitizers in combination with photopolymerization initiator (C). Examples of the photosensitizers include amines, ureas, sulfur-containing compounds, phosphorus-containing compounds, chlorine-containing compounds, nitriles, and other nitrogen-containing compounds. These may be used alone or at least two types may be used in combination. In the case where the photosensitizer is added, the amount of addition is preferably within the range of 0.01 to 25 parts by mass relative to 100 parts by mass of urethane (meth)acrylate resin (A).

The curable resin composition according to the present invention may include other various additives as necessary. Examples of various additives include an ultraviolet absorber, an antioxidant, a silicone-based additive, a fluorine-based additive, a rheology control agent, a defoaming agent, an antistatic agent, and an anti-fogging agent. In the case where the additives are added, the amount of addition is preferably within the range of 0.01 to 40 parts by mass relative to 100 parts by mass of curable resin composition according to the present invention within the bounds of sufficiently exerting the effects of the additives and not inhibiting ultraviolet curing.

The viscosity of the curable resin composition according to the present invention is preferably 6,000 mPa·s or less because the composition distributes in every corners of a mold without shortcomings even under a high-speed coating condition.

The curable resin composition according to the present invention can be cured by being irradiated with ultraviolet rays or visible light.

In the case where curing is performed by ultraviolet rays, curing can be performed by irradiation with mercury lamps, e.g., an ultra-high pressure mercury lamp, a high pressure mercury lamp, and a low pressure mercury lamp, a xenon lamp, a carbon arc, a metal halide lamp, and the like. The exposure of the ultraviolet rays at this time is preferably within the range of 0.1 to 1,000 mJ/cm².

The cured product of the curable resin composition according to the present invention has a high refractive index and excellent flexibility, and cracking and chipping do not easily occur during cutting. Such features are utilized, and the cured product can be suitably used for various optical materials, for example, plastic lenses, e.g., a spectacle lens, a digital camera lens, a Fresnel lens, and a prism lens, an optical overcoating agent, a hard coating agent, an antireflection film, an optical fiber, an optical waveguide, a hologram, a prism lens, an LED sealing material, and a solar cell coating material, and is particularly suitable for plastic lenses, e.g., liquid crystal substrate prism lens, among these.

The liquid crystal substrate prism lens has a plurality of fine prism-shaped portions on one surface of a sheet-like formed body and is a sheet-like lens which is usually used while being disposed on the back surface (light source side) of a liquid crystal element such that the prism surface faces the element side and a light guide sheet is disposed on the back surface thereof, or a sheet-like lens in which the above-described prism lens also has a function of the light guide sheet.

In this regard, the shape of the prism portion of the prism lens has an angle θ of the prism apex angle of preferably within the range of 70° to 110°, particularly within the range of 75° to 100°, and most of all, within the range of 80° to 95° because the light-collecting ability is excellent and the brightness is enhanced.

Also, the pitch of the prism is preferably 100 μm or less, and particularly within the range of 70 μm or less from the viewpoint of preventing an occurrence of a moire pattern on the screen and improving the degree of fineness of the screen. Also, the height of unevenness of the prism is determined in accordance with the values of the angle θ of the prism apex angle and the pitch of the prism and is preferably within the range of 50 μm or less. In addition, sheet thickness of the prism lens is preferably larger from the viewpoint of the strength but is preferably smaller from the optical viewpoint of suppressing light absorption. From the balance between these, the range of 50 μm to 1,000 μm is preferable.

Examples of methods for producing the prism lens by using the curable resin composition according to the present invention include a method, in which a forming die, e.g., a mold or a resin die, provided with a prism pattern is coated with the composition, a transparent base material is stacked after the surface of the composition is smoothened, and active energy rays are radiated from the transparent substrate side so as to cure.

Examples of the transparent base substrate used here include a plastic base material composed of an acrylic resin, a polycarbonate resin, a polyester resin, a polystyrene resin, a fluororesin, or a polyimide resin or glass.

The prism sheet produced by the above-described method can be used without modification, or the prism lens may be used alone after the transparent base material is peeled off. In the case where the transparent base material provided with the prism portion is used without modification, for the purpose of enhancing adhesion between the prism lens and the transparent base material, it is preferable that the surface of the transparent base material be subjected to treatment, e.g., primer treatment, for enhancing the adhesion in advance.

Meanwhile, in the case of use after the transparent base material is peeled off, it is preferable that the surface of the transparent base material be treated with silicone or a fluorine-based release agent in advance for the purpose of facilitating peeling of the transparent base material.

In the case where the curable resin composition according to the present invention is used for the optical material to be applied to the prism lens and the like, the refractive index of the cured product thereof is preferably 1.6 or more.

In the case where the curable resin composition according to the present invention is used for the optical material to be applied to the prism lens and the like, it is preferable that a photo-curable resin composition adjusted to have a combined composition that can realize both or one of high brightness and recoverability be used.

Next, the present invention will be specifically described with reference to the examples and comparative examples, but the present invention is not limited to these. In this regard, all part and % in the instances are on a mass basis excluding the light transmittance.

The viscosity was measured by using an E-type rotational viscometer ("RE80U" produced by Toki Sangyo Co., Ltd.) under the condition of 25° C.

The refractive index was measured by using an Abbe refractometer ("NAR-3T" produced by ATAGO CO., LTD.). The temperature condition was usually set to be 25° C., and the refractive index of a solid, when the temperature was 25° C., was measured by setting an appropriate temperature.

Example 1

After introducing 174.2 g (1 mol) of tolylene diisocyanate, 250.3 g (1 mol) of 4,4'-diphenylmethane diisocyanate, 1,035 g of o-phenylphenoxyethyl acrylate, 2,000 ppm of 3,5-ditertiary butyl-4-hydroxytoluene, 200 ppm of methylhydroquinone, and 350 ppm of tin octanoate into a 5-liter flask provided with an agitator, a gas inlet tube, a condenser, and a thermometer, 232.2 g (2 mol) of 2-hydroxyethyl acrylate was gradually dropped, and subsequently the temperature was raised to 80° C. so as to develop a reaction for 2 hours. Then, 378 g (1 mol) of bisphenol AP-ethylene oxide 2-mol adduct was added in fractions over 1 hour. After the whole amount was added, a reaction was developed at 80° C. for 4 hours until an infrared spectrum, which indicated an isocyanate group, at 2250 cm$^{-1}$ disappeared so as to produce a composition including urethane acrylate resin (A-1) and a diluent. The composition of the raw material monomer and the refractive index and the viscosity of the resulting resin composition are shown in Table 1.

Example 2

After introducing 174.2 g (1 mol) of tolylene diisocyanate, 250.3 g (1 mol) of 4,4'-diphenylmethane diisocyanate, 1,013 g of o-phenylphenoxyethyl acrylate, 2,000 ppm of 3,5-ditertiary butyl-4-hydroxytoluene, 200 ppm of methylhydroquinone, and 350 ppm of tin octanoate into a 5-liter flask provided with an agitator, a gas inlet tube, a condenser, and a thermometer, 232.2 g (2 mol) of 2-hydroxyethyl acrylate was gradually dropped, and subsequently the temperature was raised to 80° C. so as to develop a reaction for 2 hours. Then, 356 g (1 mol) of bisphenol Z-ethylene oxide 2-mol adduct was added in fractions over 1 hour. After the whole amount was added, a reaction was developed at 80° C. for 4 hours until an infrared spectrum, which indicated an isocyanate group, at 2250 cm$^{-1}$ disappeared so as to produce a composition including a urethane acrylate resin. The composition of the raw material monomer and the refractive index and the viscosity of the resulting resin composition are shown in Table 1.

Comparative Example 1

After introducing 174.2 g (1 mol) of tolylene diisocyanate, 250.3 g (1 mol) of 4,4'-diphenylmethane diisocyanate, 982 g of o-phenylphenoxyethyl acrylate, 2,000 ppm of 3,5-ditertiary butyl-4-hydroxytoluene, 200 ppm of methylhydroquinone, and 350 ppm of tin octanoate into a 5-liter flask provided with an agitator, a gas inlet tube, a condenser, and a thermometer, 232.2 g (2 mol) of 2-hydroxyethyl acrylate was gradually dropped, and subsequently the temperature was raised to 80° C. so as to develop a reaction for 2 hours. Then, 325.2 g (1 mol) of bisphenol A-ethylene oxide 2-mol adduct was added in fractions over 1 hour. After the whole amount was added, a reaction was developed at 80° C. for 4 hours until an infrared spectrum, which indicated an isocyanate group, at 2250 cm$^{-1}$ disappeared so as to produce a composition including a urethane acrylate resin. The composition of the raw material monomer and the refractive index and the viscosity of the resin composition are shown in Table 1.

Comparative Example 2

After introducing 348.4 g (2 mol) of tolylene diisocyanate, 905 g of o-phenylphenoxyethyl acrylate, 2,000 ppm of 3,5-ditertiary butyl-4-hydroxytoluene, 200 ppm of methylhydroquinone, and 350 ppm of tin octanoate into a 5-liter flask provided with an agitator, a gas inlet tube, a condenser, and a thermometer, 232.2 g (1 mol) of 2-hydroxyethyl acrylate was gradually dropped, and subsequently the temperature was raised to 80° C. so as to develop a reaction for 2 hours. Then, 325.2 g (1 mol) of bisphenol A-ethylene oxide 2-mol adduct was added in fractions over 1 hour. After the whole amount was added, a reaction was developed at 80° C. for 4 hours until an infrared spectrum, which indicated an isocyanate group, at 2250 cm$^{-1}$ disappeared so as to produce a composition including a urethane acrylate resin. The composition of the raw material monomer and the refractive index and the viscosity of the resin composition are shown in Table 1.

Comparative Example 3

After introducing 500.6 g (2 mol) of 4,4'-diphenylmethane diisocyanate, 525 g of benzyl acrylate, 2,000 ppm of 3,5-ditertiary butyl-4-hydroxytoluene, 200 ppm of methylhydroquinone, and 350 ppm of tin octanoate into a 5-liter flask provided with an agitator, a gas inlet tube, a condenser, and a thermometer, 232.2 g (2 mol) of 2-hydroxyethyl acrylate was gradually dropped, and subsequently the temperature was raised to 80° C. so as to develop a reaction for 2 hours. Then, 492.6 g (1 mol) of bisphenol A-ethylene oxide 3-mol adduct was added in fractions over 1 hour. After the whole amount was added, a reaction was developed at 80° C. for 4 hours until an infrared spectrum, which indicated an isocyanate group, at 2250 cm$^{-1}$ disappeared so as to produce a composition including a urethane acrylate resin. The resulting resin composition was in a crystallized state. The composition of the raw material monomer and the refractive index of the resin composition are shown in Table 1.

Comparative Example 4

After introducing 500.6 g (2 mol) of 4,4'-diphenylmethane diisocyanate, 512 g of benzyl acrylate, 2,000 ppm of 3,5-ditertiary butyl-4-hydroxytoluene, 200 ppm of methylhydroquinone, and 350 ppm of tin octanoate into a 5-liter flask provided with an agitator, a gas inlet tube, a condenser, and a thermometer, 232.2 g (1 mol) of 2-hydroxyethyl acrylate was gradually dropped, and subsequently the temperature was raised to 80° C. so as to develop a reaction for 2 hours. Then, 460.6 g (1 mol) of bisphenol A-propylene oxide 2-mol adduct was added in fractions over 1 hour. After the whole amount was added, a reaction was developed at 80° C. for 4 hours until an infrared spectrum, which indicated an isocyanate group, at 2250 cm$^{-1}$ disappeared so as to produce a composition including a urethane acrylate resin. The resulting resin composition was in a crystallized state. The composition of the raw material monomer and the refractive index of the resin composition are shown in Table 1.

TABLE 1

|  | Example 1 | Example 2 | Comparative example 1 | Comparative example 2 | Comparative example 3 | Comparative example 4 |
|---|---|---|---|---|---|---|
| Diol (mol) | BP-AP(EO2) (1 mol) | BP-Z(EO2) (1 mol) | BPA(EO2) (1 mol) | BPA(EO2) (1 mol) | BPA(EO3) (1 mol) | BPA(PO2) (1 mol) |
| Diisocyanate (mol) | TDI (1 mol) | TDI (1 mol) | TDI (1 mol) | TDI (2 mol) | — | — |
| Diisocyanate (mol) | MDI (1 mol) | MDI (1 mol) | MDI (1 mol) | — | MDI (2 mol) | MDI (2 mol) |
| Acrylate (mol) | HEA (2 mol) | HEA (2 mol) | HEA (2 mol) | HEA (2 mol) | HEA (2 mol) | HEA (2 mol) |
| Polymerizable diluent OPPEA (wt %) | 50 | 50 | 50 | 50 | — | — |
| Polymerizable diluent BZA (wt %) | — | — | — | — | 30 | 30 |
| Refractive index (25° C., with diluent) | 1.591 | 1.582 | 1.585 | 1.577 | 1.572 | 1.569 |
| Viscosity (with diluent) (25° C., Pa · s) | 830 | 690 | 1200 | 31 | — | — |
| Remarks | — | — | — | — | crystallized | crystallized |

<Footnote of Table 1>
BP-AP(EO2): bisphenol AP-ethylene oxide 2-mol adduct
BP-Z(EO2): bisphenol Z-ethylene oxide 2-mol adduct
BPA(EO3): bisphenol A-ethylene oxide 2-mol adduct
BPA(PO2): bisphenol A-propylene oxide 2-mol adduct
TDI: tolylene diisocyanate
MDI: 4,4'-diphenylmethane diisocyanate
HEA: 2-hydroxyethyl acrylate
OPPEA: o-phenylphenoxyethyl acrylate
BZA: benzyl acrylate

The invention claimed is:

1. A urethane (meth)acrylate resin produced by reacting an aromatic diisocyanate compound (a), a bisphenol-ethylene oxide adduct diol (b) having at least three aromatic ring or alicyclic structures in the molecule, and a hydroxy-containing (meth)acrylate compound (c).

2. The urethane (meth)acrylate resin according to claim 1, wherein the bisphenol-ethylene oxide adduct diol (b) having at least three aromatic ring or alicyclic structures in the molecule is an ethylene oxide adduct diol of at least one bisphenol selected from the group consisting of bisphenol AP, bisphenol BP, bisphenol M, bisphenol P, bisphenol PH, bisphenol TMC, and bisphenol Z.

3. The urethane (meth)acrylate resin according to claim 1, comprising a structural site (a-1) denoted by a structural formula (1) described below

[Chem. 1]

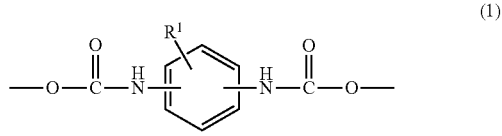

(1)

(in the formula, $R^1$ represents a hydrogen atom or a methyl group) and a structural site (a-2) denoted by a structural formula (2) described below

[Chem. 2]

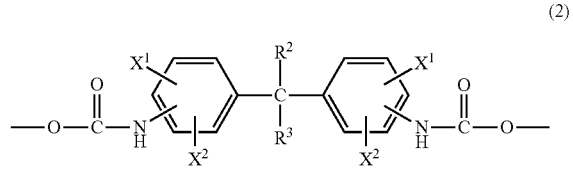

(2)

(in the formula, each of $R^2$, $R^3$, $X^1$, and $X^2$ represents a hydrogen atom or a methyl group) as urethane structural sites resulting from the aromatic diisocyanate compound (a).

4. The urethane (meth)acrylate resin according to claim 3, wherein the molar ratio [(a-1)/(a-2)] of the structural site (a-1) to the structural site (a-2) is 45/55 to 60/40.

5. A curable resin composition comprising the urethane (meth)acrylate resin (A) according to claim 1 and a polymerizable diluent (B).

6. The curable resin composition according to claim 5, having a viscosity at 25° C. of within the range of 10 to 1,000 Pas.

7. The curable resin composition according to claim 5, further comprising a photopolymerization initiator (C).

8. A cured product produced by curing the curable resin composition according to claim 5.

9. A plastic lens produced by curing the curable resin composition according to claim 5.

* * * * *